US008236278B2

(12) United States Patent
Wei et al.

(10) Patent No.: US 8,236,278 B2
(45) Date of Patent: Aug. 7, 2012

(54) MONO-DISPERSIVE SPHERICAL INDIUM OXIDE-BASED PARTICLES AND METHOD FOR PRODUCING THE SAME

(75) Inventors: Wen-Cheng Wei, Taipei (TW); Sung-En Lin, Taipei (TW)

(73) Assignee: National Taiwan University, Taipei (TW)

( * ) Notice: Subject to any disclaimer, the term of this patent is extended or adjusted under 35 U.S.C. 154(b) by 1228 days.

(21) Appl. No.: 12/020,818

(22) Filed: Jan. 28, 2008

(65) Prior Publication Data
US 2009/0110930 A1    Apr. 30, 2009

(30) Foreign Application Priority Data

Oct. 25, 2007    (TW) ................................ 96140144 A

(51) Int. Cl.
*C01G 15/00* (2006.01)
*C01G 19/00* (2006.01)
(52) U.S. Cl. ........................................................ 423/624
(58) Field of Classification Search .......... 423/122–129, 423/624
See application file for complete search history.

(56) References Cited

U.S. PATENT DOCUMENTS

| | | | | |
|---|---|---|---|---|
| 2,654,769 A | * | 10/1953 | Kozacik et al. ................. | 556/40 |
| 6,533,966 B1 | * | 3/2003 | Nonninger et al. ........ | 252/520.1 |
| 2006/0216224 A1 | * | 9/2006 | Watanabe et al. ............. | 423/624 |

FOREIGN PATENT DOCUMENTS

| | | |
|---|---|---|
| CN | 1314871 A | 9/2001 |
| CN | 1837055 A | 9/2006 |
| JP | 04-325415 | * 11/1992 |

* cited by examiner

*Primary Examiner* — Steven Bos
(74) *Attorney, Agent, or Firm* — Volpe and Koenig, P.C.

(57) ABSTRACT

An indium oxide-based particle is provided. The indium oxide-based particle has a mono-dispersive and spherical non-crystalline structure (spherical morphology with amorphous phase). The diameter of particle is ranged between 0.10 μm and 0.70 μm, and the content of an indium oxide is ranged between 10.0 percent by mass and 99.9 percent by mass. The indium oxide-based particle is generated by the precursor with indium ion reacting with alpha hydroxyl acid in an aqueous solution with alkali-modifier additive at a constant temperature. The indium-oxide based particle can be further calcinated as a crystalline indium oxide particle.

13 Claims, 6 Drawing Sheets

⊢ 1 μm

⊢ 1 μm

┠ 1 μm

┠ 1 μm

MONO-DISPERSIVE SPHERICAL INDIUM OXIDE-BASED PARTICLES AND METHOD FOR PRODUCING THE SAME

FIELD OF THE INVENTION

The present invention relates to an indium oxide-based particle and the producing method thereof. In particular, the present invention relates to a mono-dispersive spherical indium oxide-based particle and the producing method thereof.

BACKGROUND OF THE INVENTION

Sub-micron or nano-sized spherical particle with the uniform particle diameter is applied relatively widespread. The most common is being the calibration standard of equipment. If the particle shows an irregular morphology and the assembled powder has a worse flowability, the powder is not favored for the uses of packing material, for instance, dry pressing material. Then the powder belongs to low-leveled products for engineering applications. In optics, sub-micron or nano-sized spherical particles can be applied in manufacturing photonic crystal having periodic structure. The particles which have a uniform size and spherical morphology can also be provided for sintering to get dense components.

The most common sub-micron or nano-sized spherical particle with the uniform particle size is silicon dioxide ($SiO_2$) reproduced by Stöber method (1968). At present, this technology is the most mature method for the production of high quality $SiO_2$ particles, and has the advantages of easily-controlling particle size and distribution. In addition to $SiO_2$, the sub-micron or nano-sized spherical particle with the uniform particle size is yttrium oxide ($Y_2O_3$), cerium dioxide ($CeO_2$), titanium dioxide ($TiO_2$) and zinc oxide ($ZnO$), etc. However, at present, there is no any spherical indium oxide-based particles available and the producing method thereof.

Indium oxide ($In_2O_3$) has a crystal structure of bixbyite, and the crystalline structure is cubic system. The coordination number of indium ion is 6, and indium ions in the structure are situated in the octahedral sites. The crystal lattice constant of $In_2O_3$ is 1.0117 nanometer (nm), and the space group thereof is Ia3. A unit cell includes 14 octahedral structures of $InO_6$, wherein the coordination number of oxygen is 4, and the density of $In_2O_3$ with high purity is 7.075 g/cm$^3$.

$In_2O_3$ is a kind of n-type semiconductor oxide, and the bandgap is 3.6 eV. At present, tin (Sn) is the most common additive of $In_2O_3$ because the size of tin ion is extremely close to that of indium ion. However, the valence number of tin ion is more than that of indium ion. A donor-type defect of $In_2O_3$ is formed, and the electrical conductivity of indium oxide can be increased enormously. While a trace amount of tin is added in $In_2O_3$, indium tin oxide (ITO) is formed. ITO is an excellent electrical conductive oxide, and has been applied in many photoelectric elements, such as transparent electrical conductive film.

The most common producing method of the indium oxide-based particle is the co-precipitation method and the hydrothermal method.

In the co-precipitation method, the precipitant in two or more cation solutions is reacted and oversaturated for obtaining uniform-ingredient precipitate. The precipitate can be further synthesized as the metallic compound in solution having various ingredients. The advantages of the co-precipitation method lies in that the particle size and the particle morphology can be controlled. If the particle is formed in nano-size, the specific surface area of the nano-sized particle is high and becomes very high activity. In addition, the co-precipitation method has the advantages of uniform particle size, ease process at room temperature, and low production cost, etc. However, the drawbacks of the co-precipitation method lies in that the precipitate if in poor control usually forms as gelation or agglomeration. This agglomerated precipitate is needed to disperse or to wash for many times, so as to remove the residues (e.g. the cationic or anionic impurity).

The hydrothermal method assists the growth of the crystalline phase of the $In_2O_3$-based particle by utilizing the function of the aqueous solution under controlled temperature and pressure. The advantage of the hydrothermal method lies in that the particles with specified particle size and specified crystal formation are formed in the hydrothermal environment which has the operation temperatures lower than the crystallization temperature of oxide precipitates. This is greatly reducing the drawback of agglomeration formed by high temperature calcination and sintering. However, the batch operation in high-pressured reactor is essential in the hydrothermal method. The cost increases mostly due to the disadvantage of discontinuous production.

It is therefore attempted by the applicant to deal with the above situation encountered in the prior art.

SUMMARY OF THE INVENTION

In accordance with one aspect of the present invention, a method for preparing an $In_2O_3$-based particle is provided. The method includes steps of: (a) dissolving an indium ion in a water for forming an indium ion solution; (b) dissolving a carboxylic acid in the indium ion solution; and (c) reacting the indium ion solution with an alkaline solution for obtaining the $In_2O_3$-based particle.

Preferably, the indium ion is one selected from a group consisting of an indium nitrate, an indium chloride, an indium chloride hydrous, and a combination thereof.

Preferably, the carboxylic acid is an alpha hydroxyl acid having at least a carboxyl group.

Preferably, the alpha hydroxyl acid is one selected from a group consisting of a citric acid, a malic acid, a tartaric acid, a glycolic acid, a lactic acid, a mandelic acid, and a combination thereof.

Preferably, the carboxylic acid dissolved in the indium ion solution has a first molality and the indium ion dissolved in the water has a second molality, and the first molality divided by the second molality provides a first molar ratio ranged between 1:8 and 10:8.

Preferably, the alkaline solution is one selected from a group consisting of an urea, a sodium hydroxide, an ammonium bicarbonate and a combination thereof.

Preferably, the indium ion dissolved in the water has a second molality and alkaline solution has a third molality, and the third molality divided by the second molality provides a second molar ratio ranged between 1:8 and 15:8.

Preferably, the step (c) reacts thermostatically.

Preferably, the step (c) has a reaction temperature lower than a boiling point of water.

Preferably, the $In_2O_3$-based particle has a size ranged from 0.1 micrometer (μm) to 0.7 μm.

Preferably, the $In_2O_3$-based particle has a non-crystalline structure.

Preferably, the $In_2O_3$-based particle is mono-dispersed.

Preferably, the $In_2O_3$-based particle has a spherical shape.

Preferably, the method further comprises a step of: (d) calcinating the $In_2O_3$-based particle for obtaining an $In_2O_3$.

Preferably, the $In_2O_3$-based particle is calcinated at a temperature ranged between 300° C. and 1000° C.

Preferably, the $In_2O_3$ is calcinated less than 12 hours.

Preferably, the $In_2O_3$ has a crystalline structure.

In accordance with another aspect of the present invention, an $In_2O_3$-based particle is provided. The $In_2O_3$-based particle includes a non-crystalline structure having a particle size ranged from 0.1 μm to 0.7 μm, and a content of an $In_2O_3$ of the $In_2O_3$-based particle ranged between 10.0% by mass and 99.9% by mass.

Preferably, the $In_2O_3$ particle is mono-dispersed.

Preferably, the $In_2O_3$ particle has a spherical shape.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

Figure 1A:
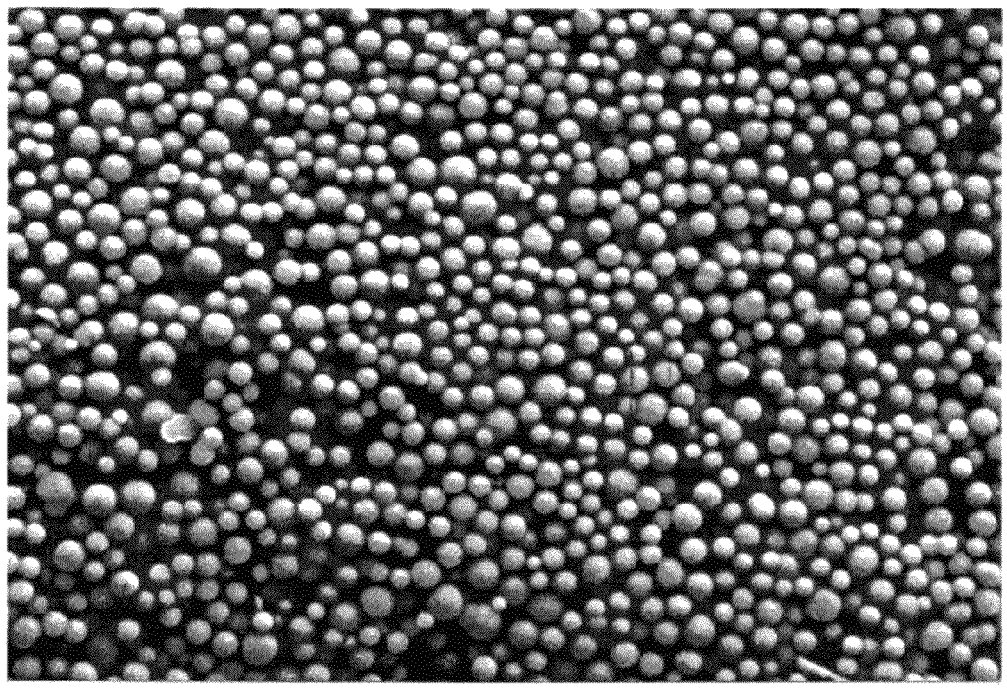
FIG. 1(A) and FIG. 1(B) are the scanning electronic microscopic (SEM) micrographs showing the $In_2O_3$-based particles produced from citric acid in accordance with the first preferred embodiment of the present invention.

The present invention will now be described more specifically with reference to the following embodiments. It is to be noted that the following descriptions of preferred embodiments of this invention are presented herein for purpose of illustration and description only; it is not intended to be limited to the precise form disclosed.

In order to obtain the mono-dispersive, uniform particle size and spherical shape sub-micron or nano-sized $In_2O_3$-based particle, alpha hydroxyl acid is taken for the reaction modifier in the present invention. Alpha hydroxyl acid is mixed with the initial aqueous solution having indium ion, and then the alkali-modifier additive is added therein to react thermostatically for obtaining the $In_2O_3$-based particle. The $In_2O_3$-based particle can be applied in manufacturing photonic bandgap crystal with the periodic structure in optic ranges (0.3 to 0.7 μm).

In the embodiment as follows, in order to manufacture sub-micron or nano-sized $In_2O_3$-based particle, indium nitrate ($In(NO_3)_3$) of 99.9%, which was obtained from Titanex Corp., Taiwan, was being the initial aqueous solution with indium ion. Three different alpha hydroxyl acids, citric acid ($C_6H_8O_7$) with 99.5% purity, malic acid ($C_4H_6O_5$) with 99% purity and tartaric acid ($C_4H_6O_6$) with 99% purity, were obtained from Acros Organics, New Jersey, U.S.A. and were being the reaction modifiers. Urea ($CH_4N_2O$) with 99.5% purity was obtained from Acros Organics, New Jersey, U.S.A. and was being the alkali-modifier additive.

Embodiment 1

Citric acid was taken for the reaction modifier in this embodiment. First, a fixed amount of indium nitrate aqueous solution (0.008 mol/kg) was mixed with citric acid having different concentrations according to the ratios (referring to Table 1), and then a fixed amount of the urea solution (0.012 mol/kg) and deionized water were added slowly until achieving a fixed ratio. When adding in, there was not any white precipitate generated. After mixing well for about 3 minutes, this aqueous solution was reacted at 80° C. for 6 to 24 hours. After reacted for a period, the $In_2O_3$-based particles precipitated from the solution, and then was centrifuged at 5,000 r.p.m. for 30 minutes for separating the precipitates from the reacted aqueous solution. After separation, the precipitates were dispersed in the deionized water. The above-mentioned washing step was repeated for 3 times and the following analysis was proceeded. Then, the powder was the $In_2O_3$-based particle.

The phase of the $In_2O_3$-based particles before and after calcination are analyzed by X-ray diffractometer (XRD) (Philip P W 1972, Philips Instrument, Netherlands). The morphologies and the particle sizes of the precipitates were analyzed by a field emission scanning electron microscope (FE-SEM) (Model 1530, LEO Instrument, England). The mass variations and the endothermic/exothermic characteristics of the precipitates according to the heat treatment temperature were analyzed by a thermogravimetric analysis (TGA) system (Thermal Gravity Analyst 2000, Dupont Co., Delaware, U.S.A.).

TABLE 1

The concentration of the added initial material, reaction time and the description of product in Embodiment 1 (reaction temp. = 80° C.)

| No. | Concentration of initial material | | | | | Reaction Time (hr) | Description of product |
| --- | --- | --- | --- | --- | --- | --- | --- |
| | Indium nitrate $In(NO_3)_3$ | Citric acid $C_6H_8O_7$ | Malic acid $C_4H_6O_5$ | Tartaric acid $C_4H_6O_6$ | Urea $CH_4N_2O$ | | |
| 1-1 | 0.008 | 0.001 | X* | X | 0.012 | 6~24 | No precipitate generated when aged less than 24 hours. |
| 1-2 | 0.008 | 0.005 | X | X | 0.012 | 6~24 | Spherical precipitate |

TABLE 1-continued

The concentration of the added initial material, reaction time and the description of product in Embodiment 1 (reaction temp. = 80° C.)

| No. | Concentration of initial material | | | | | Reaction Time (hr) | Description of product |
|---|---|---|---|---|---|---|---|
| | Indium nitrate $In(NO_3)_3$ | Citric acid $C_6H_8O_7$ | Malic acid $C_4H_6O_5$ | Tartaric acid $C_4H_6O_6$ | Urea $CH_4N_2O$ | | |
| 1-3 | 0.008 | 0.010 | X | X | 0.012 | 6~24 | Severe agglomeration in the precipitate |

*X presents "without added"

Embodiment 2

Malic acid is taken for the reaction modifier in this embodiment. First, a fixed amount of indium nitrate aqueous solution (0.008 mol/kg) was mixed with malic acid having different concentrations according to the ratios (referring to Table 2), and then a fixed amount of the urea solution (0.012 mol/kg) and deionized water were added slowly until achieving a fixed ratio. The following procedures and analysis were identical with Embodiment 1.

TABLE 2

The concentration of the added initial material, reaction time and the description of product in Embodiment 2 (reaction temp. = 80° C.)

| No. | Concentration of initial material | | | | | Reaction Time (hr) | Description of product |
|---|---|---|---|---|---|---|---|
| | Indium nitrate $In(NO_3)_3$ | Citric acid $C_6H_8O_7$ | Malic acid $C_4H_6O_5$ | Tartaric acid $C_4H_6O_6$ | Urea $CH_4N_2O$ | | |
| 2-1 | 0.008 | X* | 0.001 | X | 0.012 | 6~24 | Nano-sized spherical precipitate |
| 2-2 | 0.008 | X | 0.005 | X | 0.012 | 6~24 | Spherical precipitate |
| 2-3 | 0.008 | X | 0.010 | X | 0.012 | 6~24 | Spherical precipitate |

*X presents "without added"

Embodiment 3

Tartaric acid is taken for the reaction modifier in this embodiment. First, a fixed amount of indium nitrate aqueous solution (0.008 mol/kg) was mixed with tartaric acid having different concentrations according to the ratios (referring to Table 3), and then a fixed amount of the urea solution (0.012 mol/kg) and deionized water were added slowly until achieving a fixed ratio. The following procedures and analysis were identical with Embodiment 1.

Embodiment 4 (Control)

This embodiment is a controlled case and without any carboxylic acid. First, a fixed amount of indium nitrate aqueous solution (0.008 mol/kg) was added slowly in a fixed amount of urea solution (0.012 mol/kg) and deionized water until achieving a fixed ratio. However, there is without any reaction modifier added therein (referring to Table 4). The following procedures and analysis were identical with Embodiment 1.

TABLE 3

The concentration of the added initial material, reaction time and the description of product in Embodiment 3 (reaction temp. = 80° C.)

| No. | Concentration of initial material | | | | | Reaction Time (hr) | Description of product |
|---|---|---|---|---|---|---|---|
| | Indium nitrate $In(NO_3)_3$ | Citric acid $C_6H_8O_7$ | Malic acid $C_4H_6O_5$ | Tartaric acid $C_4H_6O_6$ | Urea $CH_4N_2O$ | | |
| 3-1 | 0.008 | X* | X | 0.001 | 0.012 | 6~24 | Nano-sized spherical precipitate |
| 3-2 | 0.008 | X | X | 0.005 | 0.012 | 6~24 | Spherical precipitate |
| 3-3 | 0.008 | X | X | 0.010 | 0.012 | 6~24 | Severe agglomeration |

*X presents "without added"

TABLE 4

The concentration of the added initial material, reaction time and the description of product in Embodiment 4 (reaction temp. = 80° C.)

| | Concentration of initial material | | | | | |
|---|---|---|---|---|---|---|
| No. | Indium nitrate $In(NO_3)_3$ | Citric acid $C_6H_8O_7$ | Malic acid $C_4H_6O_5$ | Tartaric acid $C_4H_6O_6$ | Urea $CH_4N_2O$ | Reaction Time (hr) | Description of product |
| 4 | 0.008 | X* | X | X | 0.012 | 6~24 | Longitudinal shaped precipitate |

*X presents "without added"

Figure 1B:
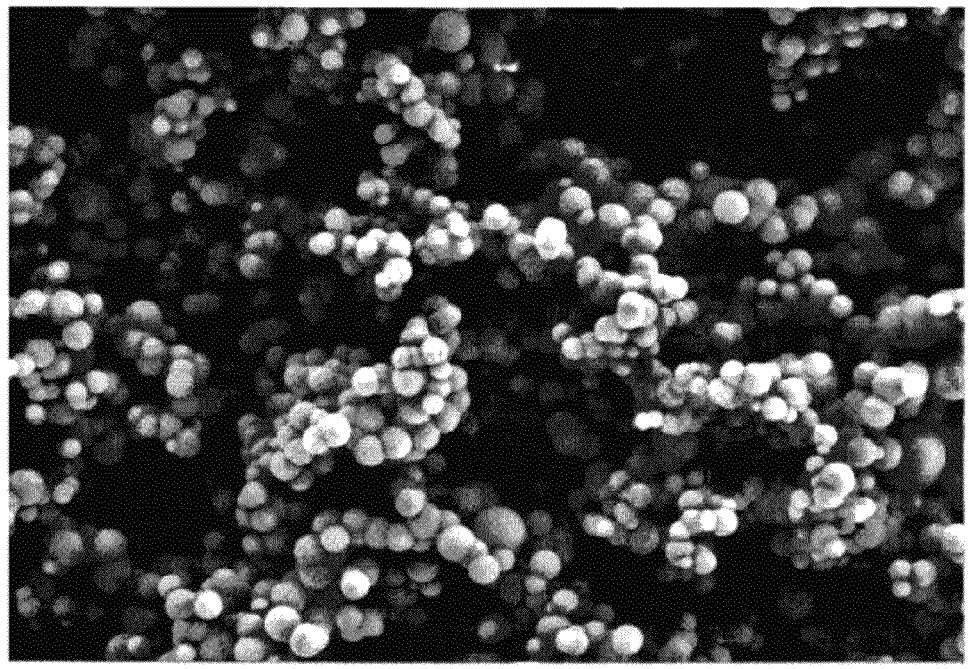

Please refer to FIG. 1(A) and FIG. 1(B), which are the SEM micrographs showing the $In_2O_3$-based particles produced from citric acid as the seed modifier in accordance with the first preferred embodiment of the present invention. FIG. 1(A) and FIG. 1(B) are the morphologies of $In_2O_3$-based particles observed by SEM, wherein citric acids of 0.005 mol/kg and 0.010 mol/kg respectively were added in the indium nitrate aqueous solution, then the urea solution was added to react for 6 hours, and finally the $In_2O_3$-based particles were washed, centrifuged and dried. In FIG. 1(A), the micrograph was taken with a magnification of 5.00 kX, an electron beam (EB) voltage of 5.00 kV, a working distance (WD) of 7 millimeter (mm), and secondary electron (SE) signal. In addition, in FIG. 1(B), the micrograph was taken with a magnification of 5.00 kX, an EB voltage of 5.00 kV, a WD of 6 mm, and SE signal. In FIG. 1(A) and FIG. 1(B), it is known that the concentration of citric acid performs the obvious influence on the morphologies of the precipitates. The $In_2O_3$-based particle in FIG. 1(A) is the spherical particle, and that in FIG. 1(B) is the spherical particle having severe agglomeration. It should be noted that there was no any $In_2O_3$-based particles generated (not shown) while the concentration of citric acid was 0.001 mol/kg or less.

Figure 2A:
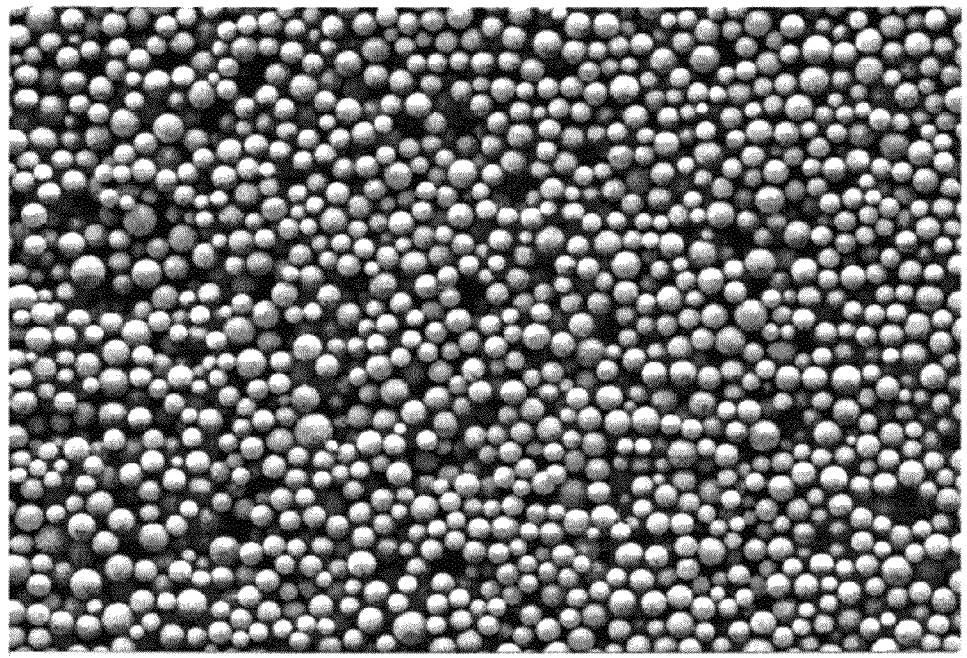
FIG. 2(A) and FIG. 2(B) are the SEM micrographs showing the $In_2O_3$-based particles produced from malic acid in accordance with the second preferred embodiment of the present invention.
Figure 2B:
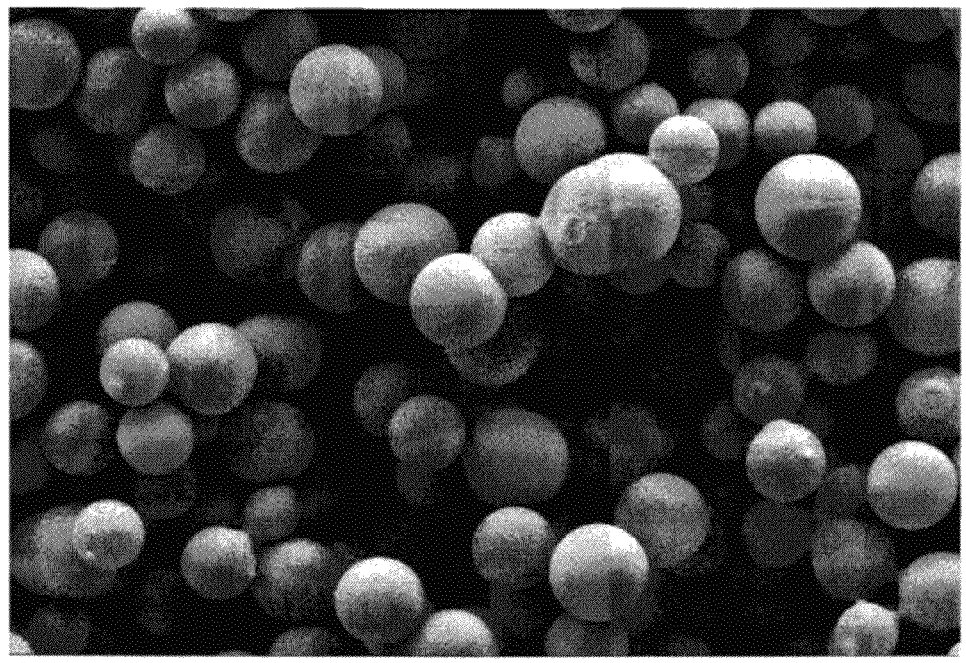

Please refer to FIG. 2(A) and FIG. 2(B), which are the SEM micrographs showing the $In_2O_3$-based particles produced from malic acid as the reaction modifier in accordance with the second preferred embodiment of the present invention. FIG. 2(A) and FIG. 2(B) are the morphologies of $In_2O_3$-based particles observed by SEM, wherein malic acids of 0.005 mol/kg and 0.010 mol/kg respectively have been added in the indium nitrate aqueous solution, then the urea solution was added to react for 6 hours, and finally the $In_2O_3$-based particles were washed, centrifuged and dried. In FIG. 2(A), the micrograph was taken with a magnification of 5.00 kX, an EB voltage of 5.00 kV, a WD of 6 mm, and SE signal. In addition, in FIG. 2(B), the micrograph was taken with a magnification of 5.00 kX, an EB voltage of 5.00 kV, a WD of 6 mm, and SE signal. In FIG. 2(A) and FIG. 2(B), it is known that the $In_2O_3$-based particles are all spherical particles. In addition, if the concentration of malic acid was 0.001 mol/kg, the precipitated $In_2O_3$-based particle would be the nano-sized spherical particle and the particle size was smaller than 50 nm (not shown).

Figure 3A:
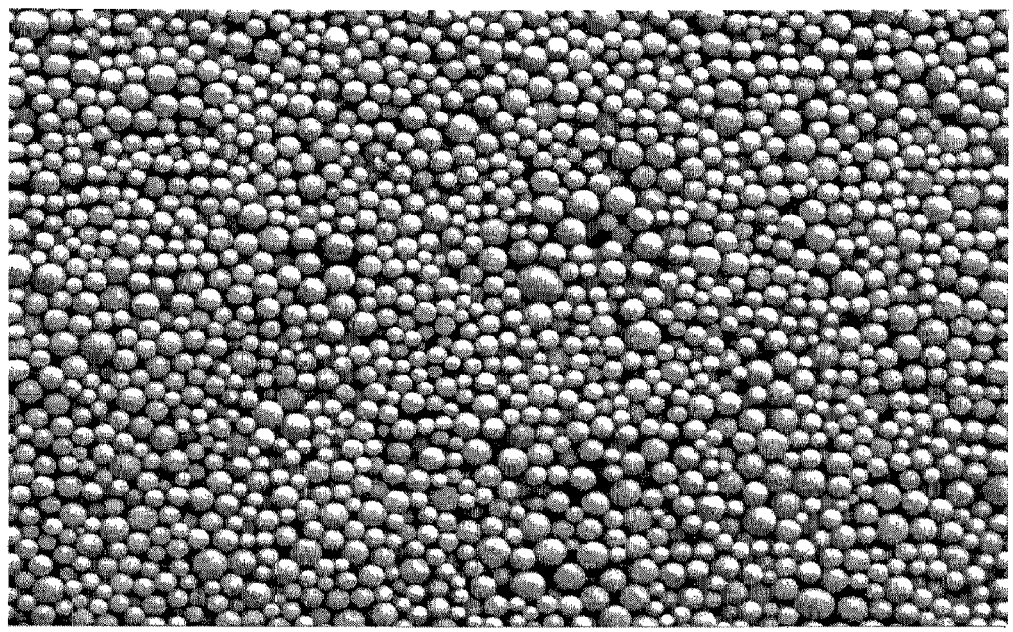
FIG. 3(A) and FIG. 3(B) are the SEM micrographs showing the $In_2O_3$-based particles produced from tartaric acid in accordance with the third preferred embodiment of the present invention.
Figure 3B:
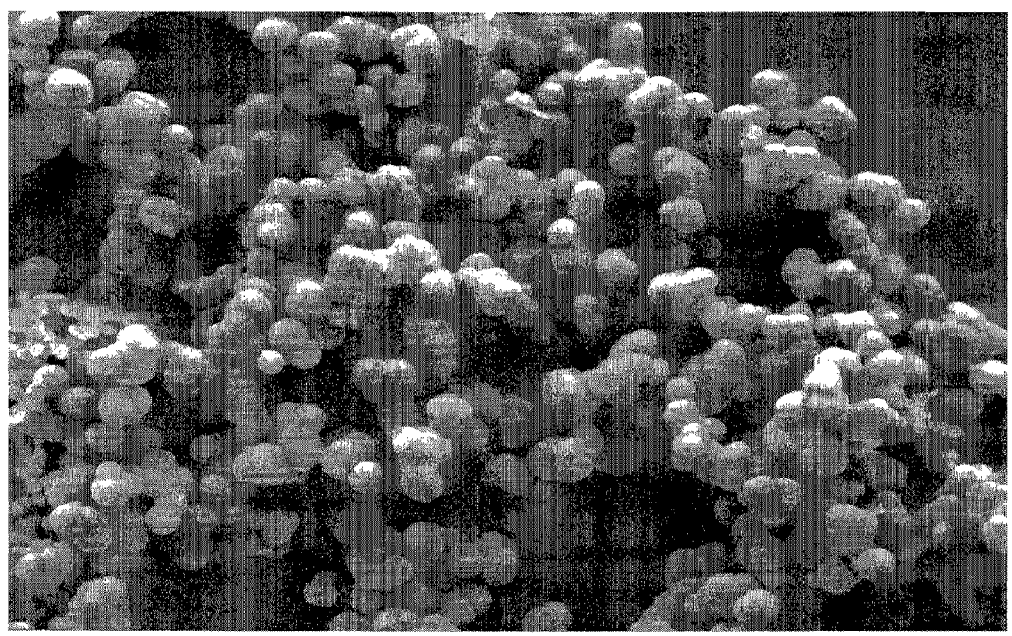

Please refer to FIG. 3(A) and FIG. 3(B), which are the SEM micrographs showing the $In_2O_3$-based particles produced from tartaric acid as the reaction modifier in accordance with the third preferred embodiment of the present invention. FIG. 3(A) and FIG. 3(B) are the morphologies of $In_2O_3$-based particles observed by SEM, wherein tartaric acids of 0.005 mol/kg and 0.010 mol/kg respectively were added in the indium nitrate aqueous solution, then the urea solution was added to react for 6 hours, and finally the $In_2O_3$-based particles were washed, centrifuged and dried. In FIG. 3(A), the micrograph was taken with a magnification of 5.00 kX, an EB voltage of 5.00 kV, a WD of 7 mm, and SE signal. In addition, in FIG. 3(B), the micrograph was taken with a magnification of 5.00 KX, an EB voltage of 5.00 kV, a WD of 6 mm, and SE signal. In FIG. 3(A) and FIG. 3(B), it is known that the concentrations of tartaric acid performs the obvious influence on the morphologies of the precipitates. The $In_2O_3$-based particle in FIG. 3(A) is the spherical particle, and that in FIG. 3(B) is the precipitate having severe agglomeration. In addition, if the concentration of tartaric acid is 0.001 mol/kg, the precipitated $In_2O_3$-based particle is also the nano-sized spherical particle and the particle size is smaller than 50 nm (not shown).

The ratio of carboxylic acid being the reaction modifier to the initial aqueous solution having indium ion and the ratio of the alkali-modifier additive to the initial aqueous solution having indium ion are relatively important in the present invention. In general, the molar ratio of carboxylic acid to the initial aqueous solution having indium ion is ranged between 1:8 and 10:8. Further, the preferred molar ratio thereof can be ranged between 3:8 and 5:8. The ratio of the carboxylic acid to the initial aqueous solution having indium ion is obtained from Tables 1, 2 and 3. The molar ratio of the alkali-modifier additive to the initial aqueous solution having indium ion is ranged between 1:8 and 15:8. Further, the preferred molar ratio thereof is ranged between 10:8 and 12:8.

Figure 4:
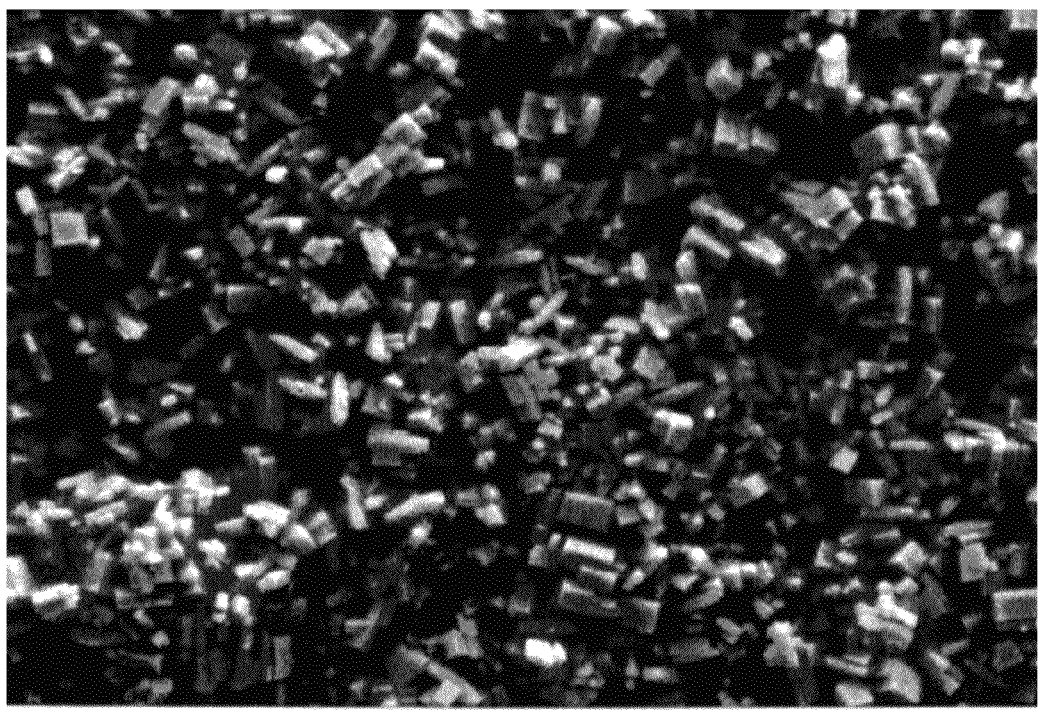
FIG. 4 is an SEM micrograph showing an $In_2O_3$-based particle produced without adding any alpha hydroxyl acid in accordance with the fourth preferred embodiment of the present invention.

Refer to FIG. 4, which is an SEM micrograph showing an $In_2O_3$-based particles produced without adding any reaction modifier (alpha hydroxyl acid) in accordance with the fourth preferred embodiment of the present invention. In FIG. 4, the micrograph was taken with a magnification of 10.00 kX, an EB voltage of 5.00 kV, a WD of 7 mm, and SE signal. the morphology of the $In_2O_3$-based particles in FIG. 4 was observed under the SEM, wherein without any alpha hydroxyl acid was added in the indium nitrate aqueous solution and the morphology of the precipitated $In_2O_3$-based particles were longitudinal or cubic shape.

It is known in Embodiments 1 to 3 that three alpha hydroxyl acids being the reaction modifiers can cause the morphologies of the $In_2O_3$-based particles to be the spherical. The particle size can be controlled by adding different concentrations of alpha hydroxyl acid and by adjusting the reaction time. Therefore, alpha hydroxyl acid is added in the initial aqueous solution with indium ion, then the alkaline modifier additive is added for reaction thermostatically, and the sub-micron or nano-sized $In_2O_3$-based particle is obtained.

Figure 5:
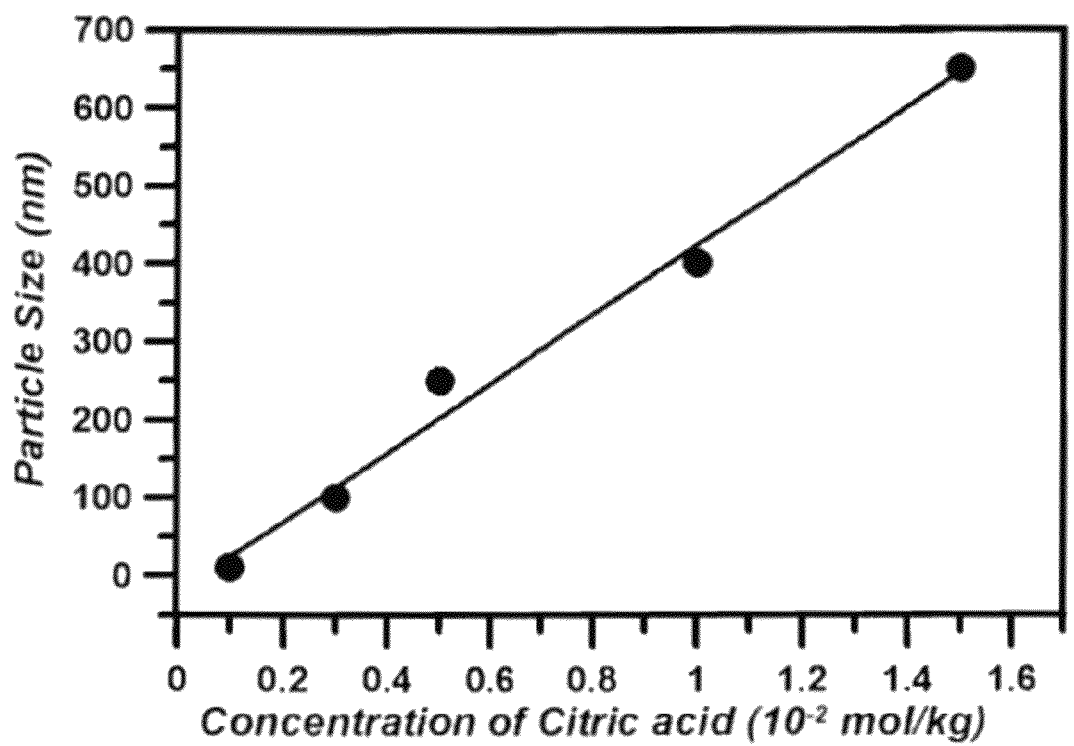
FIG. 5 is a relationship micrograph showing the concentration of citric acid and the particle size of $In_2O_3$-based particle in accordance with the first preferred embodiment of the present invention.

Refer to FIG. 5, which is a relationship micrograph showing the concentration of citric acid and the particle size of $In_2O_3$-based particle in accordance with the first preferred embodiment of the present invention. In FIG. 5, the abscissa is the concentration of citric acid ($10^{-2}$ mol/kg), and the ordinate is the average particle size of $In_2O_3$-based particle (nm). The particle size of In$_2$O$_3$-based particle increases with the concentration of citric acid. Although the particle size of the In$_2$O$_3$-based particle can be adjusted by changing the concentration of alpha hydroxyl acid, the agglomeration of the precipitates become relatively obvious when the concentration thereof increases to a certain level. Especially, it can be seen in the embodiments of adding citric acid and tartaric acid respectively (please refer to FIG. 1(B) and FIG. 3(B)).

Figure 6:
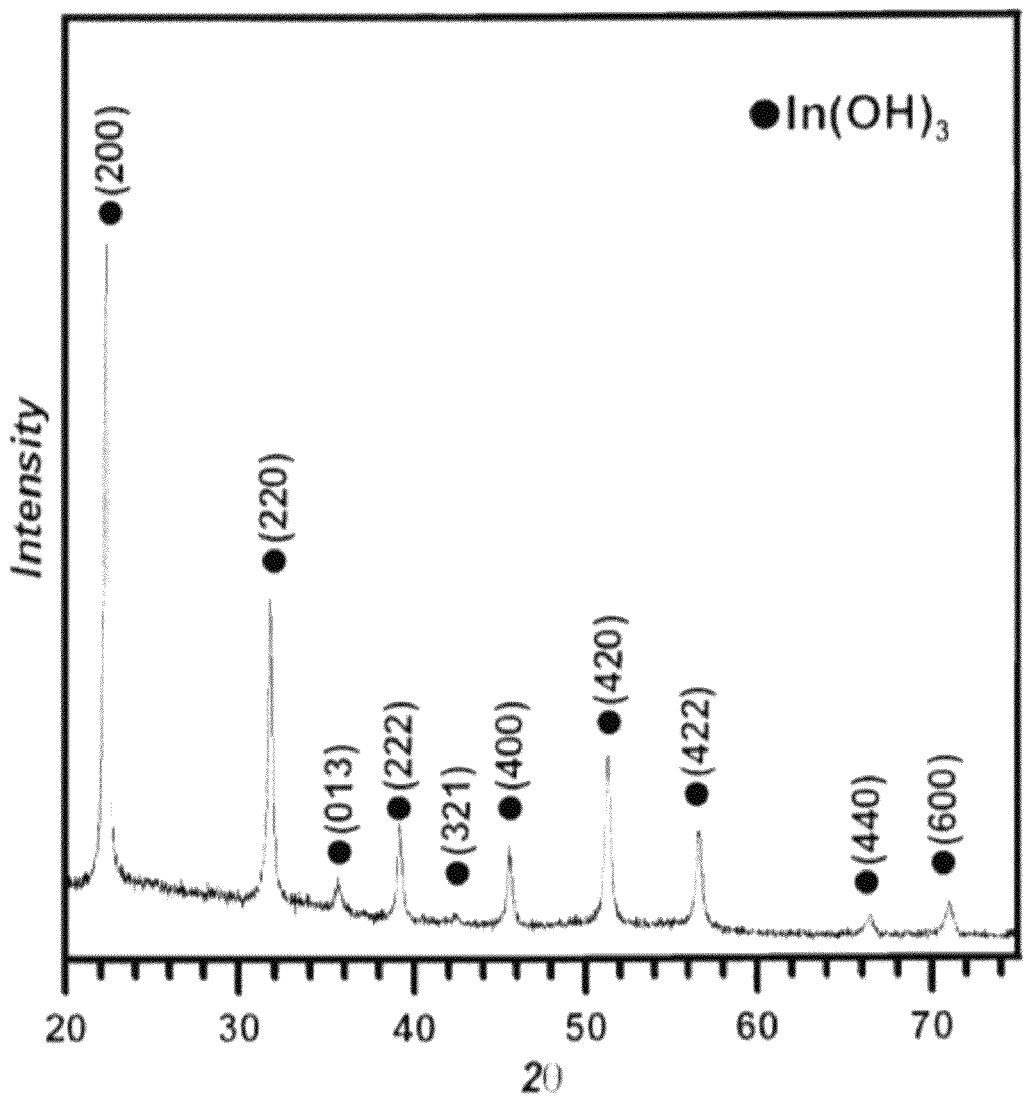
FIG. 6 is an X-ray diffraction pattern showing the crystalline phase of the longitudinal shaped precipitates produced without adding any alpha hydroxyl acid in accordance with the fourth preferred embodiment of the present invention.

Refer to FIG. 6, which is an X-ray diffraction pattern showing the crystalline phase of longitudinal shaped precipitates produced without adding any reaction modifier in accordance with the fourth preferred embodiment of the present invention. The abscissa is the diffraction angle (2θ), and the ordinate is signal intensity of X-ray. In FIG. 6, it is known that the In$_2$O$_3$-based particle which has reacted for 6 hours is the crystalline phase when without adding any alpha hydroxyl acid. The crystalline phase of the In$_2$O$_3$-based particle is indium hydroxide (In(OH)$_3$). In accordance with the previous researches, when the heat treatment temperature is higher than 300° C., the precipitate, which without adding any alpha hydroxyl acid, would transform from indium hydroxide to In$_2$O$_3$ and the morphology of the precipitate would almost keep the same. When alpha hydroxyl acid is added and reacted for 6 hours, the precipitate shows a non-crystalline structure. The spherical morphology of the precipitate will also maintain through the above-mentioned heat treatment.

The In$_2$O$_3$-based particles of the present invention can further be calcinated at 300~1000° C. for less than 12 hours as to obtain the In$_2$O$_3$ particles, wherein the preferred calcination temperature is ranged at 500~700° C., and the preferred calcination time is 2 hours. The content of In$_2$O$_3$ is ranged between 10.0% by mass and 99.9% by mass. The obtained In$_2$O$_3$ particles after calcination can maintain the spherical morphology.

In conclusion, being the reaction modifiers, alpha hydroxyl acids are added in the initial aqueous solution with indium ion, and the alkali-modifier additive is added to react thermostatically for obtaining sub-micron or nano-sized In$_2$O$_3$-based particle in the present invention. The In$_2$O$_3$-based particle has the advantages of mono-dispersive and spherical morphology, and overcomes the drawbacks of the co-precipitation method, which the gelation or the agglomerated precipitate is possibly generated and the residues are needed to wash away for many times, and the hydrothermal method, the use of high-pressured reactor is essential. The production cost is increased due to the discontinuous production. The sub-micron or nano-sized In$_2$O$_3$-based particle of the present invention can be effectively applied in the size calibration standard of equipment, for manufacturing photonic bandgap crystal having periodic structure, and for sintering of dense material.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for preparing In$_2$O$_3$-based particles, comprising steps of:
    (a) dissolving an indium ion in water to form an indium ion solution, wherein the indium ion is selected from the group consisting of indium nitrate, indium chloride, hydrous indium chloride and a combination thereof;
    (b) dissolving a carboxylic acid in the indium ion solution; and
    (c) thermostatically reacting the solution with an alkaline solution to obtain the In$_2$O$_3$-based particles having a submicron spherical shape and being size controllable.

2. The method according to claim 1, wherein the carboxylic acid is an alpha hydroxyl acid having at least a carboxyl group.

3. The method according to claim 2, wherein the alpha hydroxyl acid is selected from the group consisting of citric acid, malic acid, tartaric acid, glycolic acid, lactic acid, mandelic acid, and a combination thereof.

4. The method according to claim 1, wherein the carboxylic acid dissolved in the indium ion solution has a first molality and the indium ion dissolved in the water has a second molality, and the first molality divided by the second molality provides a first molar ratio between 1:8 and 10:8.

5. The method according to claim 1, wherein the alkaline solution is selected from the group consisting of urea, sodium hydroxide, ammonium bicarbonate and a combination thereof.

6. The method according to claim 1, wherein the indium ion dissolved in the water has a second molality and an alkaline solution has a third molality, and the third molality divided by the second molality provides a second molar ratio between 1:8 and 15:8.

7. The method according to claim 1, wherein the In$_2$O$_3$-based particles have a size from 0.1 μm to 0.7 μm.

8. The method according to claim 1, wherein the In$_2$O$_3$-based particles have a non-crystallized structure.

9. The method according to claim 1, wherein the In$_2$O$_3$-based particles are mono-dispersive.

10. The method according to claim 1, further comprising a step of:
    (d) calcining the In$_2$O$_3$-based particles to obtain In$_2$O$_3$ particles.

11. The method according to claim 10, wherein the In$_2$O$_3$-based particles are calcined at a temperature between 300° C. and 1000° C.

12. The method according to claim 10, wherein the In$_2$O$_3$-based particles are calcined less than 12 hours.

13. The method according to claim 10, wherein the In$_2$O$_3$ particles have has a crystalline structure.

* * * * *